H. C. DREW'S
IMPROVED STAKER.

No. 121,281.　　　　　　　　　　　Patented Nov. 28, 1871.

Witnesses.
Chas. O. Simonds
Edward Taggart

Inventor.
H. C. Drew

UNITED STATES PATENT OFFICE.

HIRAM CHARLES DREW, OF JAMESTOWN, MICHIGAN.

IMPROVEMENT IN MODES OF FASTENING HORSE-POWERS.

Specification forming part of Letters Patent No. 121,281, dated November 28, 1871; antedated November 24, 1871.

*To all whom it may concern:*

Be it known that I, HIRAM CHARLES DREW, of Jamestown, county of Ottawa, State of Michigan, have invented certain new and useful Improvements in the Plan of Staking Horse-Powers; and I do hereby declare that the following is a full, clear, and exact description of the construction and operation of the same, reference being had to the annexed drawing making a part of this specification, in which—

Figure 2:
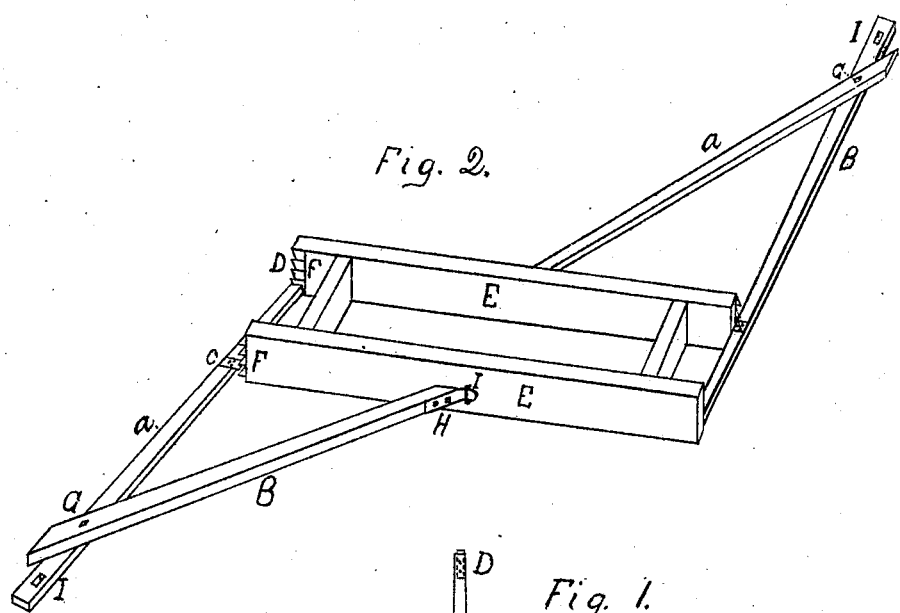
Figure 1:
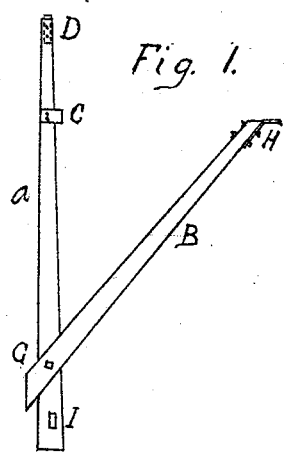

Figure 1 is a perspective view of the same. Fig. 2 is a representation of my invention as attached to a power.

In order to enable those skilled in the art to more fully understand my invention, I will proceed to describe it.

This invention consists in applying levers or braces to the ends and sides of a power for the purpose of more effectually securing it in its position, and, at the same time, to save the most of the labor in staking or fastening the power in its place.

Let A and B represent the two levers constituting the braces.

Similar letters of reference indicate corresponding parts in the several figures.

The lever A, Fig. 1, has a plate of iron, C, bolted on its upper side, also a plate of iron, D, at the end bolted on its under side, both of which project beyond the surface of the brace A and attach, by means of ratchets F F, Fig. 1, to the ends of the power E E.

It will readily be seen that the lever A, connecting with the power E E, Fig. 2, by means of the plates C and D and the ratchets F F, and held in their place by the brace B, prevents the power from tipping, which is a great advantage over other devices used for similar purposes which allow powers to tip. The ratchets F F allow the staker to adjust itself to uneven ground and still hold the power as firm as on the level ground. The brace B is fastened to the brace A by a bolt, G, which passes through them and forms a hinge, which allows the braces to be closed together for convenience in moving. The brace B is attached to the power when in use by means of the hook H and staple I. J is a mortise through which the stake is driven through the staker into the ground, which adds greatly to the strength of the stake, as it prevents the stake from being tipped or pushed over by the pressure of the machine against it, for the stake, if moved at all, is not tipped, but is obliged to pass bodily through the ground. The brace B being bolted to the brace A prevents the staker from being turned by the stake, thus holding the stake at all times in a perpendicular position, which is a great advantage to the stake in holding the machine, which other devices for similar purposes do not possess.

I do not claim as new the idea of attaching braces or levers to a power for the purpose of holding it in its position; neither do I claim as new the idea of placing levers or bars across the ends of the machine to prevent its tipping; but What I do claim as new, and desire to secure, is—

1. The mode of constructing and applying levers or braces to powers for the purpose and in the manner described.

2. The mode of holding the stake upright by the mortise J, in connection with the braces or levers A and B and the pivot G, and the plates C and D and ratchets F F, all in the manner and for the purposes specified and set forth.

HIRAM CHARLES DREW.

Witnesses:
S. M. SAGE,
F. H. PEET.

(159)